2,990,325
Patented June 27, 1961

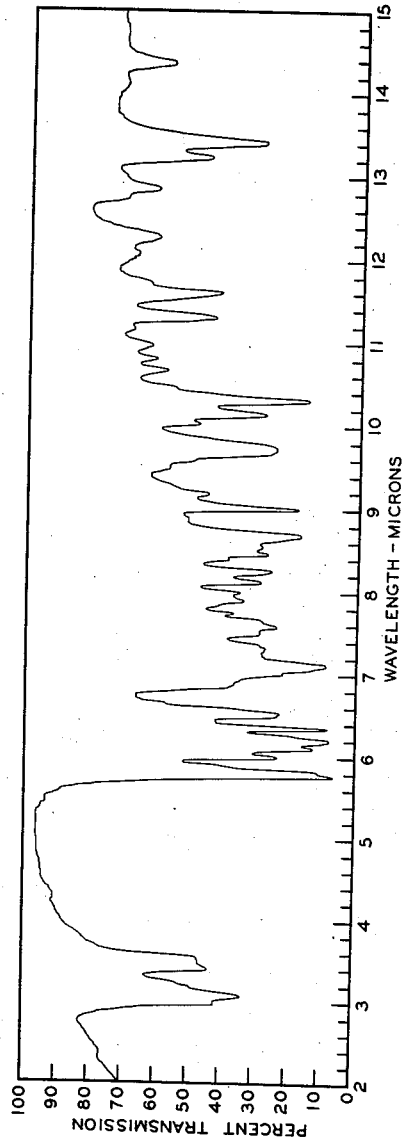

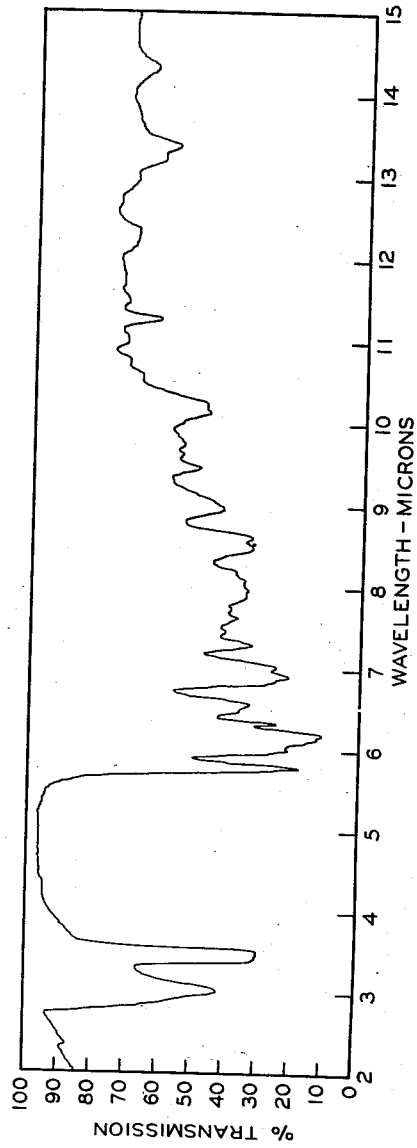

2,990,325
ANTIBIOTICS
Richard Donovick, Westfield, James D. Dutcher, New Brunswick, Leon J. Heuser, Princeton, and Joseph F. Pagano, Bound Brook, N.J., assignors to Olin Mathieson Chemical Corporation, New York, N.Y., a corporation of Virginia
Filed Nov. 16, 1955, Ser. No. 547,138
9 Claims. (Cl. 167—33)

This application is a continuation-in-part of our parent application, Serial No. 332,112, filed January 19, 1953, now abandoned.

This invention relates to new and useful antibiotics, their method of preparation, and compositions containing them. More particularly, it relates to new antibiotics in various forms, processes for producing them by fermentation, as well as concentrating, purifying and isolating them, and producing their salts, and to compositions containing them useful in plant husbandry. In its free form, one of the two new antibiotics that have been isolated is called vernamycin A; and the other new antibiotic is called vernamycin B; and the unmodified term vernamycin is employed herein to generically designate these two antibiotics and their admixture. Elaborations products similar to vernamycin have also been referred to collectively as streptogramin.

The antibiotics of this invention are formed by the cultivation, under controlled conditions, of a hitherto undiscovered species of Streptomyces.

THE MICROORGANISM

The microorganism employed for the preparation of vernamycin is *Streptomyces loidensis* isolated from a soil sample obtained in Southgate, California. A culture of the living microorganism has been deposited and made available as part of the stock culture collection of the Institute of Microbiology, Rutgers University, New Brunswick, New Jersey, where it has been designated as Streptomyces sp. Waksman Collection 3662. The culture has also been deposited at and made part of the American Type Culture Collection, Washington, D.C., where it has been given the number 11415 (hence may be identified as Streptomyces sp. ATCC 11415). Cultures are available from either source.

It has been understood that the invention is not limited to the use of the particular organism described herein, but includes, inter alia, mutants produced from the described organism by mutating agents, such as X-rays, ultraviolet radiation, actinophages, and nitrogen mustards.

For isolating and characterizing the microorganism, a portion of the soil sample (1 g. approximately) is diluted with sterile water, plated on an agar consisting of: sucrose, 1%; citric acid, 0.12%; $(NH_4)_2HPO_4$, 0.04%; KCl, 0.008%; $MgCl_2 \cdot 6H_2O$, 0.0418%; $MnCl_2 \cdot 6H_2O$, 0.0036%; $FeCl_3 \cdot 6H_2O$, 0.0023%; $ZnCl_2$, 0.0021%; $CoCl_2 \cdot 6H_2O$, 0.0004%; galactose, 1.0%; agar, 1.5%; and distilled water, and the plates incubated at 26° C. for 10 days. A colony of the newly isolated Streptomycete, selected from the microorganisms on the plates, when streak tested against bacteria has been found to show activity against *Micrococcus pyogenes* var. *aureus*, *Aerobacillus polymyxa*, and *Streptococcus faecalis*.

Following is a description of colonies of the microorganism after 6 days' incubation at 26° C. in various agar media; the designated colors being based on Ridgway, "Color Standards and Color Nomenclature," Washington, D.C., 1912:

In yeast-beef agar consisting of yeast extract, 0.3%; beef extract, 0.15%; peptone, 0.6%; dextrose, 0.1%; agar, 1.5%; and distilled water: colonies are circular, opaque, surface smooth with finely granular sporulation, edge ciliate. Aerial mycelium and spores are pallid purplish gray. Reverse colony color is light pinkish cinnamon to Sayal brown. No diffusible pigment produced.

In Czapex-Dox agar consisting of $NaNO_3$, 0.3%; $KH_2PO_4$, 0.1%; KCl, 0.05%; $MgSO_4 \cdot 7H_2O$, 0.05%; $FeSO_4 \cdot 7H_2O$, 0.001%; glucose, 4.0%; agar, 1.5%; and distilled water: colonies are circular, entire and opaque. Spores are white to pale gull gray. Reverse colony color is cinnamon. No exo-pigment is produced.

In Sabouraud's agar consisting of neopeptone, 1.0%; dextrose, 4.0%; agar, 1.5%; and distilled water: colonies are circular, opaque, convex, with ciliate edge. Spores are white to lighter than pale gull gray. Reverse colony color is antique brown. No exo-pigment is produced.

In soybean infusion agar consisting of soy infusion, boiled 30 minutes, filtered, 2%; dextrose, 0.2%; sodium chloride, 0.5%; agar, 2.0%; and distilled water (adjusted to pH 7.0 before sterilization): colonies are circular, opaque, coarsely granular with lacerate edge. Spores are white to cinereous. Reverse colony color is cartridge buff to pale olive gray. No exo-pigment is produced.

In Henrici agar consisting of casein hydrolysate, 0.5%; glycerine, 0.5%; $K_2HPO_4$, 0.2%; $MgSO_4 \cdot 7H_2O$, 0.2%; $FeSO_4 \cdot 7H_2O$, 0.2%; agar, 1.5%; and distilled water: colonies are circular, opaque, convex with entire and undulate edge. Spores are white to pale gull gray. Reverse colony color is cream buff to pale gull gray. No exo-pigment is produced.

The microorganism is capable of assimilating the following carbon sources in a basal medium containing $(NH_4)_2SO_4$ as a source of nitrogen: arabinose, rhamnose, xylose, glucose, galactose, fructose, mannose, lactose, maltose, sucrose, raffinose, glycerol, mannitol, dextrin, inulin, and starch.

The following carbon compounds support growth poorly; inositol, salacin and sodium citrate.

Growth is not supported by any of the following carbon compounds: dulcitol, sorbitol, sodium acetate, ammonium formate, ammonium tartrate, ammonium oxalate.

In a basal medium containing starch as a source of carbon the following nitrogen sources will support growth: ammonium sulfate, sodium nitrate, sodium nitrite, asparagine and tyrosine. Acetamide supports growth poorly.

The microorganism is also identified by its ability to grow at 26° C. and 37° C. on a variety of media. It reduces nitrate, does not produce indole, grows poorly in gelatin with no liquefaction, does not change litmus milk.

THE ANTIBIOTIC

*Streptomyces loidensis* produces a mixture of antibiotics. The mixture itself, as well as the specific antibiotics isolated from said mixture, possesses a wide antibacterial spectrum, especially against gram-positive bacteria, but no significant antifungal properties.

In order to form vernamycin, *Streptomyces loidensis* is cultivated under aerobic conditions in an aqueous nutrient medium containing assimilable sources of carbon and nitrogen until a substantial amount of antibiotic is produced. The antibiotic is then recovered from the fermentation broth as by extraction.

Although the antibiotic of this invention is preferably produced by submerged aerated culture of the microorganism to yield broths (in large scale fermentation) having potencies up to about 500 or more d.u./ml., the antibiotic may also be produced by surface culture, with aeration provided by merely exposing the surface to a sterile air supply. In either case, sources of carbon for energy and nitrogen for growth are included in the nutrient medium.

As the energy-source material one may use: a carbohydrate, such as starch, soluble starch, dextrose, sucrose, and maltose; a sugar alcohol (e.g., glycerol); or a lipid, such as (1) a fat acid, (2) a fat or (3) a mixture of such materials. Illustrative fats are lard oil, soybean oil, linseed oil, cottonseed peanut oil, coconut oil, corn oil, castor oil, sesame oil, crude palm oil, fancy mutton tallow, sperm oil, olive oil, tristearin, tripalmitin, triolein and trilaurin; and illustrative fat acids are acetic, propionic, butyric, stearic, palmitic, oleic, lauric, linoleic and myristic acids. Preferred as the energy-source materials are the carbohydrates, especially dextrose.

As sources of nitrogeneous, growth-promoting factors one may use: proteins, peptones, amino acids, or inorganic nitrates or ammonium compounds. These may be natural organics (e.g., soybean meal, corn steep liquor, meat extract, casein, fish meal, liver cake, and/or distillers solubles) or synthetics. Corn steep liquor, because of the wide variety of substances contained therein, is a valuable addition to the fermentation medium.

The media used in the process of the invention may contain precursors in addiiton to the nutrient components, to obtain other valuable products. For example, an assimilable source of cobalt may be included where cobalamines (vitamin $B_{12}$ and vitamin $B_{12}$-like products) are desired, and these by-products then recovered by conventional methods. Or steroid precursors, such as progesterone or Reichstein's Compound S or S acetate, may be added to obtain a steroid oxidized in the 11 position.

As in most fermentation processes, the process of the present invention is desirably carried out using a liquid medium containing mineral components enhancing growth of the organism, for example, sources of potassium, calcium, magnesium, sulfur, iron, other trace elements, and phosphate. These components are desirably added to the medium unless already present therein as a component (e.g., impurity) of the crude carbon- or nitrogen-source material (e.g., corn steep liquor).

In large scale fermentation by submerged aerated culture, the pH of the medium is preferably adjusted if necessary to about 7 (although a pH about 5 to about 9 may be used) by the addition of buffering agents, the pH tending to become slightly alkaline (pH about 7.5–8.5) as fermentation proceeds. Fermentation temperatures from about 20° C. to about 40° C. may be used, with a temperature of about 25° C. preferred. The stirring may be effected by mechanical agitation of 100 or more r.p.m., with aeration at a superficial velocity up to about 60 or more centimeters per minute.

Small scale fermentation, for laboratory investigation or for the production of inoculae for larger fermentations, may be conducted in shaker flasks plugged with cotton as illustrated by the following example.

*Example 1*

250 ml. of an aqueous nutrient medium containing: soybean meal, 3%; dextrose 2%; $CoCl_2 \cdot 6H_2O$, 0.0005%; and $CaCO_3$, 0.1% is placed in a one-liter Erlenmeyer flask, sterilized in the usual manner (i.e., by autoclaving), then adjusted to pH 7.0 with 12 N NaOH. The medium is then inoculated with the growth on an agar slant (either yeast-beef or soy infusion) of *Streptomyces loidensis*, and incubation is allowed to proceed for 48–96 hours on a reciprocating shaker oscillating at the rate of 140 one-inch-strokes per minute.

Other media may be used, such as aqueous media containing: (A) beef extract, 0.15%; yeast extract, 0.15%; peptone, 0.5%; dextrose, 0.5%; sodium chloride, 0.35%; $K_2HPO_4$, 0.368%; $KH_2PO_4$, 0.132%; (B) cerelose, 1%; peptone, 1%; beef extract, 0.03%; yeast extract, 0.5%; and (C) dextrose, 4%; peptone 1%.

Larger scale fermentations may be conducted as illustrated by the procedures of the following two examples:

*Example 2*

PREPARATION OF INOCULUM

*Stage I.*—Yeast beef or soybean infusion agar slants are used to inoculate 100 ml. portions of the following germination medium (contained in 500 ml. flasks): Soybean meal, 1.5%; glucose, 2.02%; NaCl, 0.1%; $CaCO_3$, 0.5%; and $CoCl_2 \cdot 6H_2O$, .005%. The medium is adjusted to pH 6.8–7.2 with 12 N NaOH before sterilization in an autoclave for 30 minutes at 121° C. The flasks are then incubated at 25° C. for 72 hours on a reciprocating shaker having a 2-inch throw and making 120 strokes per minute.

*Stage II.*—Using the 72-hour Stage I flasks, a 15 ml. transfer is made to one-liter side arm shake flasks, each containing 300 ml. of the same germination medium as that used in Stage I. The flasks are then incubated at 25° C. for 48 hours on a reciprocating shaker under the same conditions as those described for Stage I.

FERMENTATION

To 10 liters of a fermentation medium consisting of soybean meal, 1.5%; glucose, 2.0%; NaCl, 0.1%; $CaCO_3$, 0.5%; and $CoCl_2 \cdot 6H_2O$, .0005%, in an 18.9 liter stainless steel tank, is added the contents of one Stage II flask, obtained as described above.

Fermentation is then allowed to proceed at 25° C. with stirrer-agitation at 300 r.p.m. and aeration at a rate of 28.3 liters/min. (superficial velocity—56.6 cm./min.). A positive tank pressure is maintained at .35 kg./cm$^2$ gauge, with lard oil or Prime Burning Oil being added as needed as an antifoam agent. After 84 hours' fermentation, the broth (tube dilution assay against *Micrococcus pyogenes* var. *aureus* 240 d.u./ml.) is adjusted to pH 2–3 with $H_2SO_4$ (conc.), then immediately neutralized and filtered with a filter aid (e.g., Hy Flo).

*Example 3*

PREPARATION OF INOCULUM

*Stage I.*—The procedure is the same as that employed in Example 2, Stage I.

*Stage II.*—The 72-hour Stage I flasks are used to inoculate 4000 ml. flasks containing 1000 ml. of the medium used in Stage I. Incubation at 25° C. proceeds for 72 hours on the shaker described in Example 2.

*Stage III.*—The contents of a Stage II flask are transferred to 197 liters of a medium containing soybean meal, 1.5%; glucose, 2.0%; NaCl, .1%; $CaCO_3$, .5%; and $CoCl_2 \cdot 6H_2O$, .0005% in a 378 liter glass lined tank. Fermentation is then allowed to proceed at 25° C. for 60 hours with stirrer-agitation at 120 r.p.m., an aeration at superficial velocity of 61 cm./min. A positive tank pressure is maintained at .70 kg./cm.$^2$ gauge, with lard oil being added as needed as an antifoam agent.

FERMENTATION

To 3000 liters of the fermentation medium given for Stage III germination, in a 4550 liter glass lined tank, is added 197 liters from the Stage III tank obtained as described above. Fermentation is then allowed to proceed at 25° C. with stirrer-agitation at 120 r.p.m. and aeration linear velocity of 61 cm./min. A positive tank pressure is maintained at .70 kg./cm.$^2$ gauge with lard oil being added as needed as an antifoam agent. After 38 hours fermentation the broth (tube dilution assay against *Streptomyces aureus* 500 d.u./ml.) is acidified to pH 2–3 with $H_2SO_4$, then, immediately neutralized, filtered with a filter aid (e.g., Hy-Flo).

Following in tabular form, are the fermentation results obtained in the course of the fermentation of Examples 2 and 3.

| 10 Liter Batch | | | 3028 Liter Batch | | |
|---|---|---|---|---|---|
| Hours | pH | S. aureus Dil. units/ml. | Hours | pH | S. aureus Dil. units/ml. |
| 0 | 6.9 | | 0 | 6.7 | 0 |
| 23 | 6.7 | 120 | 25 | 6.8 | 480 |
| 47 | 7.0 | | 37 | 7.1 | 640 |
| 71 | 6.6 | 240 | 38 | 7.0 | 500 |
| 84 | 7.2 | 240 | | | |

The antibiotics may be extracted from the neutral broth (about pH 6.5–7.5) by water-immiscible organic solvents, such as aromatic hydrocarbons (e.g. benzene), ethers (e.g. ethyl ether), organic acids (e.g. ethyl acetate and amyl acetate), alcohols (e.g. butanol), and halogenated hydrocarbons (e.g. chloroform). They can then be recovered from the resultant extract either by: evaporating the extractant therefrom, to yield a residue of the mixed antibiotics; or by concentration of the extract to small volume by evaporation, and adding hexane to precipitate a mixture of vernamycins A and B in yields amounting to from about 85 to 95% of the total broth activity.

Following are examples showing isolation of a mixture of vernamycin A and B from the filtered broth:

*Example 4*

About 144 liters of filtered broth (activity—280 du./ml.) at pH 6.5–7.5 is extracted twice with 36 liter portions of butanol at pH 7. The butanol extract is concentrated in vacuo to yield a mixture of vernamycin A and vernamycin B.

*Example 5*

About 2350 liters of filtered broth (activity—640 du./ml.) at pH 6.5–7.5 is extracted with about 250 liters chloroform in a two-stage counter-current system. The chloroform extract is concentrated in vacuo to about 15 liters and then dried with anhydrous sodium sulfate. To the dried solution is added about 4.5 liters of hexane, precipitating about 120 g. of a mixture of vernamycin A and vernamycin B (activity—4000 du./mg.).

Vernamycin can be separated into its component fractions A and B by treatment of the mixture obtained by the procedures illustrated in Examples 4 and 5 with an alcohol such as n-butanol, ethyl acetate, amyl acetate, or benzene, whereupon vernamycin B dissolves, whereas vernamycin A remains insoluble. The precipitate of vernamycin A can be further purified by recrystallization as described in Example 6. Vernamycin B can be separated from the solvent employed in the fractionation by concentration and addition of some hexane. It can be further purified by dissolving it in a small quantity of warm butanol, filtering off and discarding the insolubles, and reprecipitating it by slow addition of hexane.

The following example shows a method for fractionating a mixture of vernamycin A and vernamycin B into its respective components:

*Example 6*

10 g. of a mixture of vernamycin A and vernamycin B (activity about 5000 du./mg.), obtained by the procedure of Example 4 or 5, is slurried in 50 ml. of n-butanol and the slurry is warmed to about 40° C. to facilitate solution of soluble material. After cooling to room temperature, the insoluble residue is separated by filtration, washed with n-hexane and air dried. The dried residue (about 6 g.) is then dissolved in 150 ml. of acetone and the acetone solution is treated with 1 g. of decolorizing carbon, heated to about 40° C. and filtered. The filtrate is heated to about 50° C. and water is added until the solution becomes turbid. The turbid solution is seeded with a crystal of the antibiotic to hasten crystallization and allowed to cool. The crystalline precipitate, which separates is filtered off and dried to yield about 3.5 g. of pure vernamycin A, M.P. 193–195° C. dec.

The butanol filtrate (50 ml.) from which the insoluble vernamycin A has been filtered is concentrated to 25 ml. and 250 ml. of hexane is added. The precipitate is filtered off, washed with hexane and dried. It contains mostly vernamycin B along with a little vernamycin A. Yield amounts to about 3 g.

This material can be further purified by slurrying it in butanol (10 ml./g.), warming the mixture to 40° C. cooling, letting it stand at room temperature for a period of 3–4 hours, adding two volumes (60 ml.) of hexane, stirring for 15 minutes and filtering off the insoluble material. This procedure precipitates substantially all of the residual vernamycin A and other inactive impurities. The filtrate is warmed to 40° C. and 400 ml. of hexane is added slowly over a one-hour period. The mixture is then allowed to cool and stand overnight at room temperature. The precipitate is then filtered off, washed well with hexane and dried. The yield is about 1.4 g. of pure gold-colored crystalline vernamycin B.

Water soluble salts and complexes of vernamycin A and vernamycin B can be prepared as illustrated in the following examples:

*Example 7*

The hydrochloride salts of either vernamycin A or vernamycin B can be prepared by slurrying the solid antibiotic in water, adding an equivalent of hydrochloric acid, then freezing and lyophilizing the solution. The hydrochlorides so prepared have fair water-solubility.

*Example 8*

Water-soluble complexes of varnamycin A or vernamycin B can be prepared by adding to a concentrated slurry of either one of the vernamycins in water two equivalents of an anionic detergent (e.g. sodium lauryl sulfate) or a cationic detergent (e.g. Emulsept). The resulting solution is then frozen and lyophilized. The resulting products are soluble in water up to a 1.5–2% concentration, and the antibiotics are relatively stable in the resulting solutions.

CHEMICAL AND PHYSICAL PROPERTIES OF VERNAMYCIN A AND VERNAMYCIN B

Pure crystalline vernamycin A has the following physical and chemical characteristics:

Melting point: 193–195° C. (uncorrected) with decomposition.

Elementary analysis:
C=63.81%.
H=6.79%.
N=7.70%.
O=21.7% (by difference).
No sulfur or halogen present.
Molecular weight (Rast)=422.
Empirical formula=$C_{20}H_{25}N_2O_5$.

Specific rotation: $[a]_D^{25} = -206°$ (c.=1.0 in methanol).

Solubility: Quite soluble in methanol, ethanol, acetone,

N,N-dimethyl formamide, wet acetone, water-saturated butanol, chloroform and acetic acid.

Only slightly soluble in isopropyl alcohol, dry butanol, ethyl ether, ethyl acetate, amyl acetate, dry acetone and benzene.

Almost insoluble in water and hexane.

Ultraviolet spectrum: The ultraviolet absorption maxima of crystalline vernamycin A in methanol are:

| λ max. (mμ) | $E_{1cm}^{1\%}$ |
|---|---|
| 210–230 | 637 |
| 270 | 196 |

Infrared spectrum: The infrared absorption spectrum of vernamycin A suspended in Nujol mull is reproduced in FIGURE 1. Vernamycin A shows peaks and shoulders at the following frequencies and wave lengths:

| λ(μ) | γ(cm.⁻¹) | λ(μ) | γ(cm.⁻¹) |
|---|---|---|---|
| 3.01 | 3322 | 9.44 | 1059 |
| 3.10 | 3226 | 9.69 | 1032 |
| 3.23 | 3096 | 9.98 | 1002 |
| 3.45 | 2899 | 10.10 | 990 |
| 3.80 | 2632 | 10.27 | 974 |
| 5.77 | 1733 | 10.62 | 942 |
| 5.98 | 1672 | 10.76 | 929 |
| 6.07 | 1647 | 10.93 | 915 |
| 6.19 | 1616 | 11.14 | 898 |
| 6.35 | 1575 | 11.32 | 883 |
| 6.51 | 1536 | 11.59 | 863 |
| 7.02 | 1425 | 11.72 | 853 |
| 7.43 | 1346 | 12.03 | 831 |
| 7.49 | 1335 | 12.24 | 817 |
| 7.83 | 1277 | 12.68 | 789 |
| 7.89 | 1267 | 12.80 | 781 |
| 8.03 | 1245 | 13.18 | 759 |
| 8.15 | 1227 | 13.37 | 748 |
| 8.52 | 1174 | 14.02 | 713 |
| 8.67 | 1153 | 14.32 | 698 |
| 9.00 | 1111 | 14.73 | 679 |
| 9.16 | 1092 | | |

Neutral equivalent: The neutral equivalent of vernamycin A as determined by titration with HClO₄ after addition of Hg(OAc)₂=371.

Pure crystalline vernamycin B has the following physical and chemical characteristics:

Melting point: No specific melting point; decomposes at 130–5° C.

Elementary analysis:

C=62.93%.
H=7.17%.
N=7.40%.
O=22.50% (by difference).

No sulfur or halogens present.

Contains one methoxyl group.

Molecular weight (Rast)=585.

Empirical formula=$C_{30}H_{40}N_3O_8$.

Specific rotation: $[\alpha]_D^{25} = -72°$.

Solubility: Quite soluble in methanol, ethanol, isopropanol, butanol, acetone, methyl ethyl ketone, ethyl acetate, amyl acetate, ethyl ether, dioxane, chloroform, N,N-dimethyl formamide, benzene, and acetic acid.

Somewhat soluble in amyl alcohol, butyl ether, and trichloroethylene.

Slightly soluble in water and hexane.

Ultraviolet spectrum: There is an ultraviolet absorption maximum shoulder of crystalline vernamycin B in methanol at 230 mμ

($E_{1cm}^{1\%}$ is 590)

Infrared spectrum: The infrared absorption spectrum of vernamycin B suspended in Nujol mull is reproduced in FIGURE 2. Vernamycin B shows peaks and shoulders at the following frequencies and wave lengths:

| λ(μ) | γ(cm.⁻¹) | λ(μ) | γ(cm.⁻¹) |
|---|---|---|---|
| 3.08 | 3250 | 8.50 | 1178 |
| 3.47 | 2875 | 8.62 | 1151 |
| 5.79 | 1728 | 8.98 | 1113 |
| 6.00 | 1668 | 9.46 | 1057 |
| 6.10 | 1641 | 9.63 | 1039 |
| 6.21 | 1612 | 9.76 | 1025 |
| 6.38 | 1568 | 10.16 | 985 |
| 6.42 | 1560 | 10.58 | 945 |
| 6.48 | 1543 | 10.76 | 929 |
| 6.57 | 1522 | 10.85 | 922 |
| 6.91 | 1448 | 11.27 | 888 |
| 7.02 | 1425 | 11.46 | 873 |
| 7.31 | 1370 | 11.90 | 841 |
| 7.47 | 1340 | 12.39 | 808 |
| 7.64 | 1327 | 12.95 | 772 |
| 7.85 | 1274 | 13.24 | 756 |
| 7.88 | 1270 | 13.40 | 747 |
| 8.00 | 1251 | 14.25 | 696 |
| 8.12 | 1233 | | |

Neutral equivalent: The neutral equivalent of vernamycin B as determined by titration with HClO₄ after addition of Hg(OAc)₂=543.

BIOLOGICAL PROPERTIES OF VERNAMYCIN

Vernamycin, as a mixture, and as purified vernamycin A and vernamycin B, possess a wide antibacterial and antiviral spectrum. Among the organisms failing to propagate in the presence of the antibiotics are: *Salmonella typhosa*, *Shigella dysenteriae*, *Escherichia coli*, *Klebsiella pnuemoniae*, *Rickettsia rickettsii*, *Mircrococcus pyogenes* var. *aureus*, *Streptococcus pyogenes*, *Streptococcus faecalis*, *Diplococcus pneumoniae* type 2, *Diplococcus pneumoniae*, type #3, *Lactobacillus acidophilus*, *Corynebacterium diphtheriae*, *Bacillus subtilis*, *Clostridium septicum*, *Brucella abortus*, *Mycobacterium tuberculosis* var. *bovis* strain BCG.

Thus when a mixture of vernamycin (M), pure vernamycin A (A) and pure vernamycin B (B) were assayed by the tube dilution method versus the following organisms, the following minimal inhibiting concentrations in gamma/ml. (MIC) were found:

| Organism | M MIC | A MIC | B MIC |
|---|---|---|---|
| *Bacillus subtilis* | 2 | 13 | 1.0 |
| *Lactobacillus acidophilus* | 0.3 | 8 | |
| *Micrococcus pyogenes* var. *aureus* | 0.3 | 0.1 | 0.26 |
| *Streptococcus faecalis* | 7 | >50 | 3.13 |
| *Shigella dysenteriae* | 8 | 8 | 9.2 |
| *Clostridium septicum* | | 0.4 | |
| *Salmonella typhosa* | | 25 | 25 |
| *Escherichia coli* | | 50 | >50 |
| *Klebsiella pneumoniae* | | 50 | 16.7 |
| *Streptococcus pyogenes* C203 | | 0.15 | 0.125 |
| *Mycobacterium tuberculosis* var. *bovis* Strain BCG | | 50 | 13 |

The antibiotics of this invention possess a high order of activity, comparing very favorably with chloramphenicol when tested against gram positive organisms. The antibiotics are well absorbed and may be effectively administered by the oral route.

The following data show the potency of antibiotic-containing broths obtained in the practice of this invention, measured in dilution units (which, as used herein, is the reciprocal of the highest dilution of the broth which completely inhibits the growth of a test organism). In these tests, fermentation was allowed to proceed for the specified periods in a soybean-meal nutrient medium (adjusted to pH 7 after sterilization) consisting of: soybean meal, 3%; dextrose, 2%; CoCl₂.6H₂O, 0.0005%; and CaCO₃; 0.25%, in distilled water; and the dilution units were then determined against the selected test organisms.

DILUTION UNITS

| | Micrococcus pyogenes var. aureus 209P | | Mycobacterium tuberculosis var. bovis Strain BCG | |
|---|---|---|---|---|
| | 3 day | 7 day | 3 day | 7 day |
| Neutral pasteurized sample | 300 | <25 | <25 | <25 |
| Acid pasteurized sample | 318 | 25 | 50 | <25 | pH of fermentation at 3 days: 7.9; pH of fermentation at 7 days: 8.5.

A strain of *Micrococcus pyogenes* var. *aureus* 209P, made resistant to a concentrate of vernamycin to the extent of 752 γ/ml. was used for cross-resistance tests with a variety of antibiotics. No cross-resistance was observed with penicillin, streptomycin, streptothricin, neomycin, aureomycin, chloromycetin and oxytetracycline. [The agar dilution method which involves incorporating the antibiotic (in various concentrations) in agar and streaking the test organism on the surface of the agar was used in all cross-resistance tests.]

The antibiotic of this invention may be employed in the treatment of various infections in man and animals, inter alia, infections by the micro-organisms listed hereinbefore in connection with its antibiotic spectrum. The antibiotic may be employed per se as embodied in any of the usual formulations or dosage forms, for administration orally, parenterally, or topically. Also, the antibiotic may be administered concurrently with (or mixed with, in a suitable formulation) various other antibiotics (e.g., neomycin) or chemotherapeutic agents (e.g., N-hydroxy-2-pyridine-thione). The antibacterial effectiveness of vernamycin in human beings has not as yet been demonstrated.

Furthermore vernamycin, either as a mixture or in the form of purified vernamycin A and vernamycin B, has been found to be an effective agent in the treatment of growing and harvested vegetables and fruit infected with diseases caused by bacteria of the genera Bacillus, Erwinia, and Corynebacterium. Thus, vegetables such as lettuce which show bacterial soft rot, and fruits such as tomatoes and lemons which show bacterial spots, can be successfully treated with an aqueous spray containing 100 to 500 parts per million of vernamycin, vernamycin A, or vernamycin B, in the form of their respective water-soluble sodium lauryl sulfate complexes.

The invention may be variously otherwise embodied within the scope of the appended claims.

We claim:

1. A process for producing vernamycin, which comprises cultivating *Streptomyces loidensis* ATCC 11415 under aerobic conditions in an aqueous nutrient medium containing assimilable sources of carbon and nitrogen until a substantial amount of vernamycin is produced, and then recovering the vernamycin from the fermentation broth.

2. The process of claim 1 wherein submerged aerated conditions are maintained.

3. The process of claim 2 wherein the temperature is maintained at about 20° C. to 40° C.

4. The process of claim 2 wherein the temperature is maintained at about 25° C.

5. The process of claim 1 wherein the carbon source is selected from the group consisting of carbohydrates, sugar alcohol, and lipids, and the nitrogen source is selected from the group consisting of proteins, peptones, amino acids, inorganic nitrates and inorganic ammonium compounds.

6. A crystalline antibiotic having a melting point of about 193–195° C. dec., containing no sulfur or halogen, having the following percentage composition: C, 63.8; H, 6.8; N, 7.7; O, 21.7, having a specific rotation of −206° in methanol when measured at 25° C. by the D line of sodium, being soluble in methanol, ethanol, acetone, N, N′-dimethyl formamide, wet acetone, water-saturated butanol, chloroform and acetic acid, slightly soluble in isopropyl alcohol, dry butanol, ethyl ether, ethyl acetate, amyl acetate, dry acetone and benzene, and substantially insoluble in water and hexane, exhibiting ultraviolet absorption maxima in methanol at 210–230 mu and 270 mu, having a molecular weight of 422, and when suspended in mineral oil exhibiting characteristic absorption in the infrared region of the spectrum as indicated in FIGURE 1.

7. A crystalline antibiotic having a decomposition point of about 130–135° C., having the following percentage composition: C, 62.93; H, 7.17; N, 7.40; O, 22.5, having a specific rotation of −72° when measured at 25° C. by the D line of sodium, being soluble in methanol, ethanol, isopropanol, butanol, acetone, methyl ethyl ketone, ethyl acetate, amyl acetate, ethyl ether, dioxane, chloroform, N, N-dimethyl formamide, benzene and acetic acid, somewhat soluble in amyl alcohol, butyl ether and trichloroethylene, and slightly soluble in water and hexane, exhibiting an ultraviolet absorption maximum shoulder in methanol at 230 mu, having a molecular weight of 585, and when suspended in mineral oil exhibiting characteristic absorption in the infrared region of the spectrum as indicated in FIGURE 2.

8. The process for treating bacterial disease in plants, which comprises treating the plants with an aqueous composition containing a substantial amount of the antibiotic defined in claim 6 at a concentration of at least about 100 parts per million.

9. The process for treating bacterial disease in plants, which comprises treating the plants with an aqueous composition containing a substantial amount of the antibiotic defined in claim 7 at a concentration of at least about 100 parts per million.

References Cited in the file of this patent

UNITED STATES PATENTS

| 2,516,080 | Sobin et al. | July 18, 1950 |
| 2,787,580 | Sobin et al. | Apr. 2, 1957 |

OTHER REFERENCES

Alexopoulo: Ohio J. of Science, 1941, pages 425–430.

Waksman: "The Actinomycetes and Their Antibiotics," 1953, pages 56, 59, 107–110, 187–188.

Florey et al.: "Antibiotics," pages 375 and 376, pub. 1949.

Biological Abstracts, December 1953, page 3102, paragraph 32, 601.

Charney et al.: "Antibiotics Annual 1953–1954," pp. 171–173, pub. 1953 by the Med. Encyclopedia, Inc., N.Y.C.

Celmer et al.: Third Annual Symposium on Antibiotics, abstract of papers No. 59 and 60 presented November 2–4, 1955.

De Somer et al.: Antibiotics and Chemotherapy, pp. 632–639, November 1955.

Journal of Antibiotics, vol. 8, No. 6, Ser. B, p. 257, 1955.

"The Actinomycetes," by Waksman, 1950, pp. 116–119.

Waksman et al.: "Actinomycetes and Their Antibiotics," pp. 75, 76, 88 and 168–184, pub. by Williams and Wilkins, Baltimore, Md., 1953.

Antibiotic Annual 1953–1954, publ. by Med. Encyclopedia Inc., December 1953, pp. 171–173, speech delivered October 30, 1953.